United States Patent
Anderson, II

(10) Patent No.: US 7,114,689 B2
(45) Date of Patent: Oct. 3, 2006

(54) GIMBALED MOUNTING BRACKET

(75) Inventor: Carl John Anderson, II, Greeneville, TN (US)

(73) Assignee: Vooner Flogard Corporation, Charlotte, NC (US)

( * ) Notice: Subject to any disclaimer, the term of this patent is extended or adjusted under 35 U.S.C. 154(b) by 117 days.

(21) Appl. No.: 10/953,831

(22) Filed: Sep. 29, 2004

(65) Prior Publication Data

US 2006/0065801 A1    Mar. 30, 2006

(51) Int. Cl.
    *E04G 3/00* (2006.01)
(52) U.S. Cl. .................................... 248/278.1
(58) Field of Classification Search ............ 248/274.1, 248/276.1, 278.1; 239/65
    See application file for complete search history.

(56) References Cited

U.S. PATENT DOCUMENTS

| | | | | |
|---|---|---|---|---|
| 3,863,363 A | * | 2/1975 | Miyajima | 434/286 |
| 4,270,393 A | * | 6/1981 | Osborne et al. | 74/5 F |
| 4,295,381 A | * | 10/1981 | Hinds | 74/5 R |
| 5,243,873 A | * | 9/1993 | Demers | 74/490.06 |
| 5,353,167 A | * | 10/1994 | Kuklo et al. | 359/876 |
| 5,680,987 A | | 10/1997 | Taylor | |
| 5,912,733 A | * | 6/1999 | Dunlop et al. | 356/250 |
| 6,202,968 B1 | * | 3/2001 | Lehr | 248/278.1 |
| 6,254,730 B1 | | 7/2001 | Macierewicz | |
| 6,460,775 B1 | | 10/2002 | Duan et al. | |
| 6,700,248 B1 | * | 3/2004 | Long | 310/80 |

* cited by examiner

*Primary Examiner*—Ramon O Ramirez
(74) *Attorney, Agent, or Firm*—Dougherty Clements

(57) ABSTRACT

A gimbaled mounting bracket apparatus for aligning an actuator with a receptacle is disclosed, having a mounting ring rotatable around a pair of gudgeons. A concentric rotation ring attached to the pair of gudgeons. The concentric ring is mounted to a base along a rotational axis orthogonal to the gudgeons. The mounting ring retains a shower actuator that is to be aligned with a piping apparatus. The shower actuator can be angularly adjusted relative to piping apparatus to produce a collinear relationship, but is free of any translational movement relative to said receptacle, so as to minimize stresses exerted on said actuator.

17 Claims, 3 Drawing Sheets

GIMBALED MOUNTING BRACKET

FIELD OF THE INVENTION

This invention relates to alignment positioning mechanisms and devices. More particularly, this invention relates to a mechanism for compensating a misalignment between two structurally attached or integrated collinear members. The invention further relates to brackets having angle adjustable mounting centerlines. The invention further relates to adjustably aligning brackets used to compensate or correct for small angular discrepancies between a bracket-mounted object, and a desired collinear receiver for the object.

DESCRIPTION OF THE PRIOR ART

Showers are used at various stages in the papermaking process; for example, to clean and/or recondition conveying surfaces and to clean filters that are used for treating wastewater. A shower fitting commonly used in the papermaking industry comprises a hollow shower pipe, which is closed or restricted at one end, and connected at the other end to a source of cleaning/reconditioning fluid (usually water). The pipe has apertures along its length through which the cleaning/reconditioning fluid is discharged in jets, and the apertures contain nozzles to produce jets of various sizes and shapes (e.g., needle or fan-shaped).

The shower can be stationary, or it can move relative to the surface to be treated. For example, if the shower pipe is used to clean/recondition a papermaker's felt, it can extend across the felt and be reciprocated lengthwise. If, on the other hand, the shower pipe is used to clean a circular screen, it can extend radially outwards from the centre of the screen and rotate over the screen about an axis at the centre.

A modern paper machine turns pulp, which is a mixture of water and fiber, into paper through consecutive processes. Three sections of the machine, which are named forming, pressing and drying, play the most important roles in papermaking. Normal pulp at the head-box contains about 1% fiber and 99% water.

The former section of the paper machine takes advantage of gravity and vacuum suction to remove water from the pulp and form a sheet thereafter. In the press section, the sheet is conveyed through a series of presses where additional water is removed and the fiber web is consolidated. The water concentration is reduced to about 40% after pressing. The remaining water is further evaporated and fiber bonding develops as the paper contacts a series of steam-heated cylinders in the drying section. The moisture level drops down to about 5% to 10% after the drying section.

One of the important properties of a paper product is the moisture level. Even more important than the absolute moisture level is the uniformity of moisture in the paper product in both the machine direction and the cross machine direction. A variation in moisture content of the sheet will often affect paper quality, as much or more than the absolute moisture level. There are numerous influences on the paper machine that can cause variation of the moisture content, particularly in the cross machine direction. Wet edges and characteristic moisture profiles are common occurrences on paper sheets produced by a paper machine. Thus, a number of commercially available actuator systems have been developed to offer control of the moisture profile during paper production.

One such actuator system is a water re-wet shower that selectively adds water droplets onto the paper surface. The rewet showers employ actuator nozzle units that are mounted in sequential segments (or zones) across the paper machine direction. Water flow rate is controlled independently through each actuator nozzle unit. Hence, the moisture profile on the paper sheet can be adjusted by the rewet system. Air-atomizing nozzles are normally used in those rewet showers to generate droplets small enough to produce rewet effectively.

Another such actuator system to control the moisture profile is a steam-box that is used on a paper machine to control paper moisture and to dewater. The steam-box adds both moisture and heat to the paper surface. Adding water to the paper appears to be counterproductive, as the final purpose of the paper machine is to control the moisture to a relatively low level, typically 5% to 10%. It is the heat that is added by the steam-box that accomplishes that result. Experiments show that heating the paper with steam allows the pressing process to remove much more water than that added by condensation of the steam.

The amount of flow passing through each segment (or zone) of a rewet shower or a steam-box is adjusted through an actuator located in that segment. An actuator is a device that converts an input signal into an output movement. The output movement then can be employed in a control mechanism. In the rewet shower and the steam-box, water or steam is the medium to be controlled.

There are two types of actuators that can be used in a water rewet shower or a steam-box. One type converts a control signal to a linear movement. The linear movement is then employed to adjust proportionally an opening area in a valve mechanism. The flow amount passing through this valve is, therefore, controllable in a linear fashion by keeping the upstream flow pressure constant, and the varying opening area at the valve determines the flow rate.

The other actuator type is referred to as the regulator type. The regulator-type actuator regulates flow pressure feeding a constant opening based on a controlling reference pneumatic pressure. The varying pressure feeding the constant orifice determines the flow rate.

The regulator-type actuator is especially effective for applications requiring small flow control. It can be appreciated that precisely adjusting the opening of the small orifice is very difficult. Thus, it is much easier to keep the small orifice untouched while regulating the flow pressure feeding that orifice.

Regardless of which actuator type is chosen, current mounting arrangement of both actuators consists of a rigid clamp style mount, allowing no freedom of movement. In order to reduce stress exerted on the actuator arm, the actuator must be precisely aligned with the shower piping apparatus. Achieving this precise alignment is tedious, difficult, and time consuming.

Gimbaled mounting devices have been used for many years where angular adjustment of an instrument or other work-piece is desired, relative to the surface on which the gimbaled device is mounted. A gimbaled mounting device is defined as a mount whose axes of rotation are orthogonal and fixed in space. When the axes are made to intersect at the center of the front surface of the optic in the mount, this allows for simple non-coupled rotation adjustment of the held instrument or work-piece without translation thereof.

OBJECTS OF THE INVENTION

Accordingly, it is an object of the current invention to provide a mounting method for a shower actuator that would provide easy alignment of the actuator with the shower piping.

It is another object of the invention to provide a mounting bracket that is capable of easily aligning a shower actuator with a plumbing apparatus.

It is another object of the invention to provide a mounting bracket that is capable of automatic or self-angular adjustment of a mounted shower actuator in order to eliminate stresses that would otherwise be applied to the actuator ram.

SUMMARY OF THE INVENTION

These and other objects of the present invention, which will become apparent hereinafter, are achieved by providing a gimbaled mounting apparatus.

The actuator gimbal mount provides total freedom of movement, allowing the actuator shaft connector to follow the travel of the shower connector in any direction required by the installed shower centerline. This freedom of movement allows for faster installation, minimal alignment, and reduces stress and wear on the actuator shaft.

The actuator gimbaled mount consists of two concentric rings, one of which is attached to the outside diameter of the actuator ram housing. This inner mounting ring has two vertical mounting pivot pins, one at the top and one at the bottom, which fit into the bearing bosses on the outer pivot ring. The outer ring has two horizontal pivot pins, one on the left and one on the right. These pins fit into trunnions mounted to the frame that supports the actuator on the machine it is to be used on. The gimbal mount allows freedom of movement eliminating harmful loads that would otherwise be applied to the actuator ram.

DETAILED DESCRIPTION OF THE PREFERRED EMBODIMENTS

Figure 1:
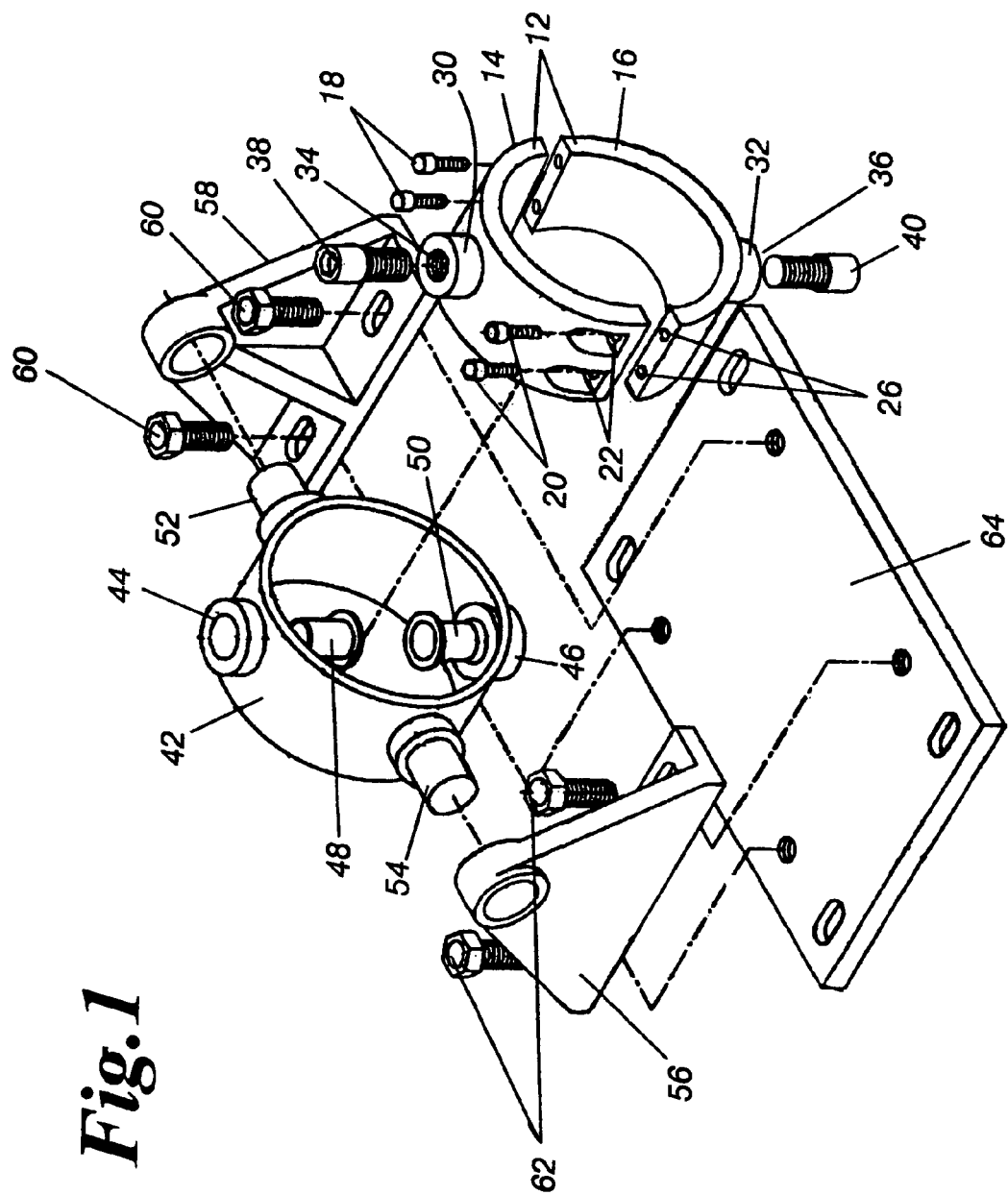
FIG. 1 is an exploded isometric view showing the various components and attachments of the mounting bracket of the current invention.
Figure 2:
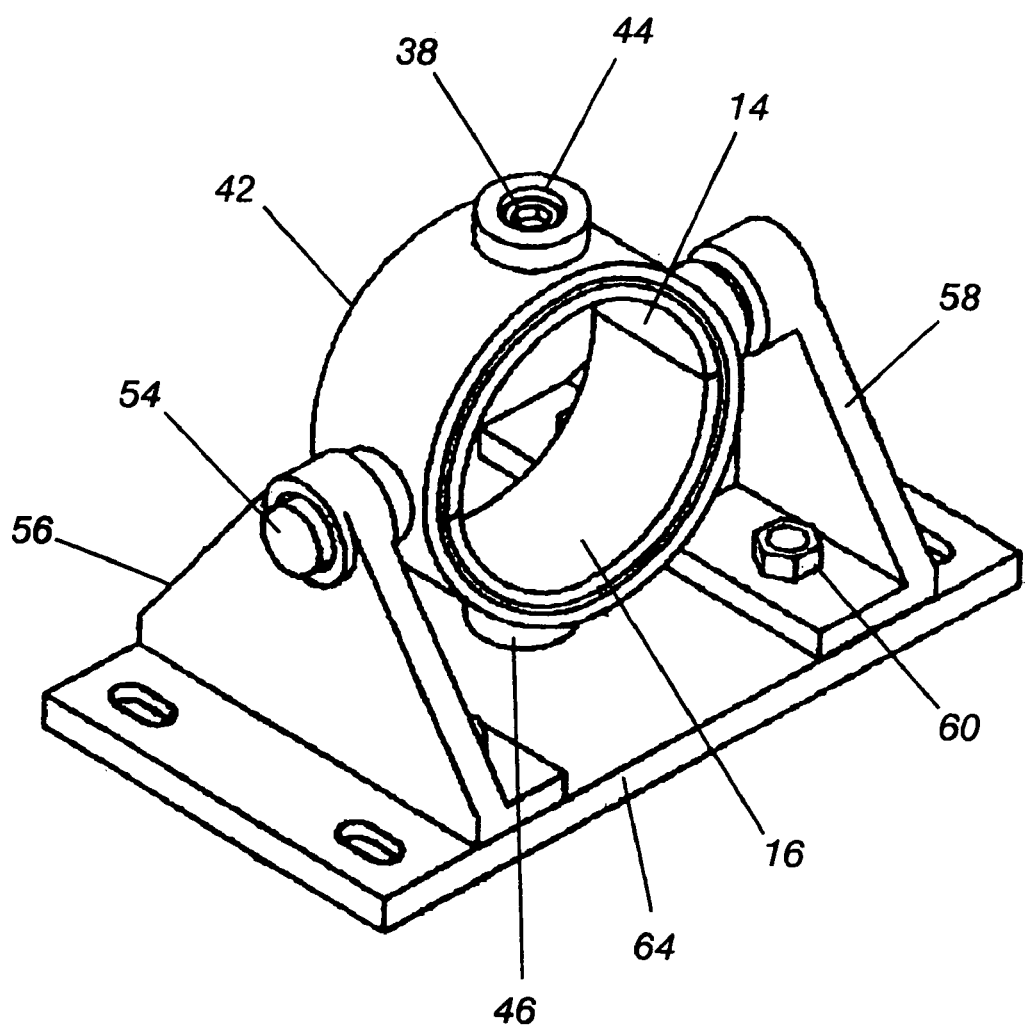
FIG. 2 is of an assembled isometric view of the mounting bracket of FIG. 1.
Figure 3:
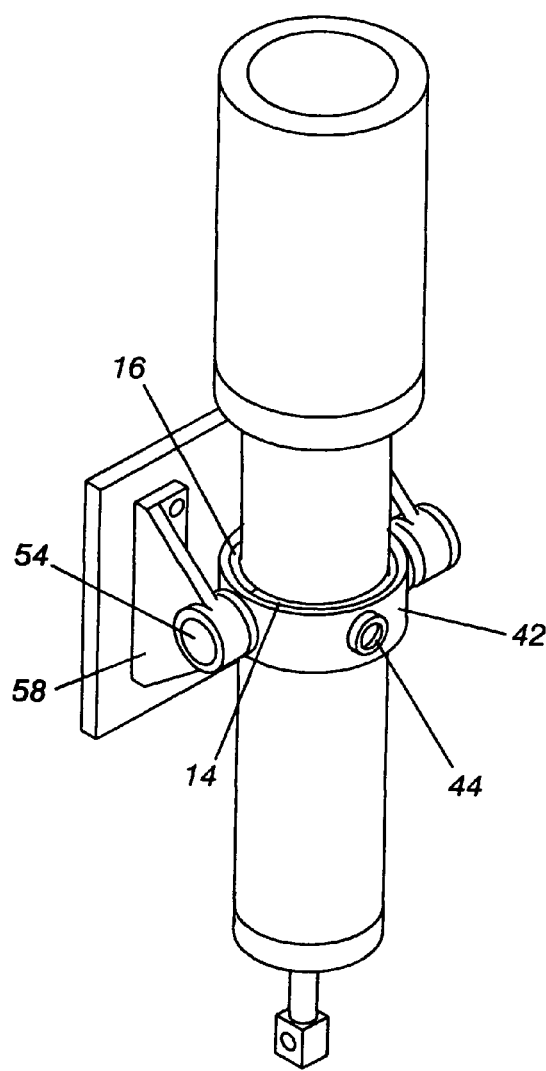
FIG. 3 is a perspective view of the mounting bracket attached to a shower actuator.
Figure 4:
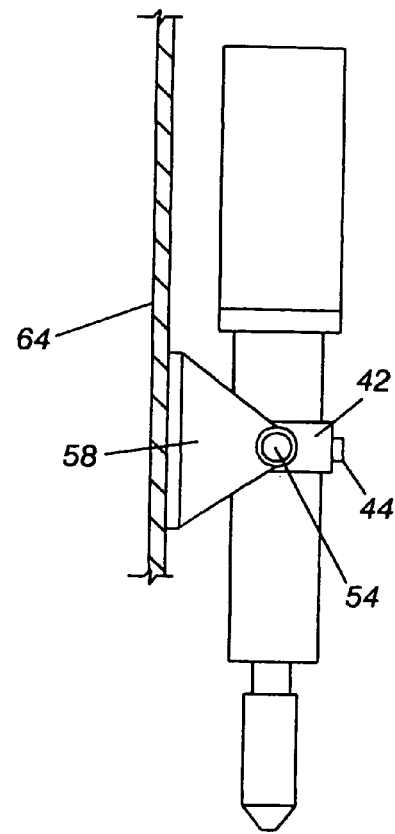
FIG. 4 is a perspective view of the mounting bracket and shower actuator assembly in alignment with a shower piping.

FIG. 1 shows an exploded view of the isometric view of the gimbaled mounting device 10.

A mounting ring 12 is provided to secure a shower actuator to the mounting device. The mounting ring's inside diameter is preferably equal to or slightly less than the outside diameter of the shower actuator so that the actuator is securely held within the mounting ring 12. A mounting ring having a larger diameter could be utilized, although this is not preferred.

The mounting ring 12 is itself comprised of at least one upper crescent member 14, and one lower crescent member 16. It is preferable that each of the crescent members has an arcuate length of less than ½ the total circumference of the mounting ring 12. Arcuate lengths of less than ½ of mounting ring's circumference are preferred in order to facilitate attaching the mounting ring 12 to the shower actuator without damage to the crescent members or the shower actuator. An arcuate length of greater than ½ of the mounting ring's circumference would result in a crescent member of greater than 180°. Such a member would either have to be slid onto the shower actuator, or would have to be deformed in order to be placed in a concentric relationship to the shower actuator. Deforming a crescent member could result in loss of performance characteristics in the assembled device.

The upper crescent member 14 and the lower crescent member 16 are provided with a plurality of screws 18, 20 to secure the upper crescent member 14 to the lower crescent member 16. One of ordinary skill in the art would recognize that other attachment mechanisms could be utilized, such as clamps, clasps, insert retaining joints (such as a dovetail type insert), or any other suitable mechanism. Regardless of the type of securing mechanism that is used, it would be preferable that such would not encroach to the interior of the mounting ring 12, which would result in an insecure bracketing of the shower actuator due to the securing mechanism forming pressure points on the actuator. If the attachment screws were to extend beyond the outer diameter, they would most likely interfere with the rotational freedom of the mounting ring 12 within the outer pivot ring (described supra). Therefore, the screws 18, 20 of the present invention are a plurality of tangential securing screws. The tangential securing screws are accessed through a recess 22, 24 in one of the crescent members 14, 16, and are received by corresponding holes 26, 28 in the adjacent crescent member.

A pair of gudgeons 30, 32 is mounted to the outer surface of the mounting ring 12. In order to ensure proper rotation of the mounting ring 12, the gudgeons 30, 32 must be mounted at opposing sides of the mounting ring 12, 180° apart from each other. The gudgeons 30, 32 of the present embodiment extend as cylindrical phalanges from the surface of the mounting ring 12. Each gudgeon 30, 32 form an axial receiver hole 34, 36 for the pivot screws 38, 40 that will secure the mounting ring 12 to the outer pivot ring 42. Preferably, the height of each gudgeon 30, 32 should be substantially equal to $$\tfrac{1}{2}(RR_{ID} - MR_{OD})$$

where $RR_{ID}$ is the inner diameter of the outer pivot ring 42, and $MR_{OD}$ is the outer diameter of the mounting ring 12. This prevents any translational shifting of the mounting ring 12 within the outer pivot ring 42. The top surface of each gudgeon 30, 32 should substantially abut the inner surface of the outer pivot ring 42.

Each gudgeon 30, 32 is provided with an axial receiving hole 24, 36 for retaining a pivot screw 38, 40. The pivot screw 38, 40 is inserted through corresponding bearing bosses 44, 46 on the outer pivot ring 42, and is then secured within the corresponding axial receiving hole 34, 36. In this manner, the mounting ring 12 is rotatably secured within the outer pivot ring 42, on an axis defined by the pivot screws 38, 40.

It is recognized that the surface where the gudgeons 30, 32 will contact the outer pivot ring 42 (or the optional pivot bushings 48, 50) can be slightly domed, so as to form a hemispherical contact. A hemispherical contact lessens the amount of friction between the gudgeons 30, 32 and the outer pivot ring 42, as well as decreases the surface contact area. This allows the mounting ring 12 to more easily rotate within the outer pivot ring 42.

Concentric with the mounting ring 12 is the outer pivot ring 42. The outer pivot ring 42 has an inside diameter that is substantially equal to, or just slightly larger than, the outer diameter of the mounting ring 12, plus the height of the gudgeons 30, 32. Because the outer pivot ring 42 does not clamp onto any member in a way similar to the mounting ring 12, the outer pivot ring 42 is preferably one continuous ring. One of ordinary skill in the art would recognize that the outer pivot ring 42 could also be broken into arcuate segments, similar to the mounting ring 12, however, such an arrangement is not preferred.

The outer pivot ring 42 is provided with two bearing bosses 44, 46 that are aligned with the pivot screws 38, 40 of the gudgeons 30, 32. Each bearing boss 44, 46 is preferably lined with a pivot bushing 48, 50. The pivot bushings 48, 50 are preferably shaped so that they cover both the area inside the bearing bosses 44, 46, as well as the areas proximate the bearing bosses that are contacted by the gudgeons 30, 32. The pivot bushings 48, 50 are made of a (nylon/Teflon) or other reduced friction material that facilitate the easy rotation of the mounting ring 12 within the outer pivot ring 42.

As stated infra, each pivot screw 38, 40 is inserted through each bearing boss 44, 46 on the outer pivot ring 42, and is then secured within the receiving hole 34, 36 of the mounting ring 12. In this manner, the mounting ring 12 is rotatably secured within the outer pivot ring 42, on an axis defined by the pivot screws 38, 40.

Integral with the outer pivot ring 42 are two trunnions 52, 54. The trunnions 52, 54 lie on a diameter of the outer pivot ring 42, and are rotated 90° from the bearing bosses 44, 46. The trunnions 52, 54 form a second rotational axis about which the outer pivot ring 42 can rotate relative to the mounting base 64.

Each trunnion 52, 54 is rotatably secured within a pivot bracket 56, 58. Each pivot bracket is secured to a mounting base 64 with a plurality of mounting screws 60, 62. This allows for easy rotational movement of the outer pivot ring 42 about the trunnion defined axis, without corresponding translational movement.

The mounting base can then be attached to any structure that provides a stable environment for aligning the centerline of the shower actuator with the shower piping. Because the mounting bracket allows for angular adjustment of a retained shower actuator, the invented mounting mechanism does not need to be as precisely aligned, as do previous mounting schemes. The mounting base can be roughly aligned with the shower piping, and angular adjustments are then effectuated by the mounting bracket itself. Preferably, the mounting bracket allows for angular adjustments of at least 5° in any angular direction. Because of the 90° offset in the rotational axes of the mounting bracket, the bracket allows total freedom of movement, allowing the actuator shaft connector to follow the travel of the shower connector in any direction required to the installed shower centerline. This freedom of movement allows for faster installation, minimal alignment, and reduces stress and wear on the actuator shaft.

While the invention has been particularly shown and described with respect to illustrative and preformed embodiments thereof, it will be understood by those skilled in the art that the foregoing and other changes in form and details may be made therein, without departing from the spirit and scope of the invention which should be limited only by the scope of the appended claims.

I claim:

1. A gimbal mounting bracket apparatus for aligning an actuator with a receptacle, said mounting bracket apparatus comprising:
    a mounting ring having an inner surface and an outer surface, said mounting ring capable of rotation around a first axis located through a diameter of said mounting ring;
    a first pair of gudgeons, mounted on collinear with said first axis on said outer surface of said mounting ring;
    an outer pivot ring having an inner surface and an outer surface, said outer pivot ring being concentric to said mounting ring with said inner surface of said outer pivot ring attached to said first pair of gudgeons, said outer pivot ring capable of rotation around a second axis, said second axis being at a right angle to said first axis;
    a first pair of trunnions, mounted on collinear with said second axis on said outer surface of said outer pivot ring;
    at least one pivot bracket that is rotatably attached to said first pair of trunnions; and
    an actuator mounted within said mounting ring;
    wherein said actuator can be angularly adjusted relative to a receptacle to produce a collinear relationship, but is free of any translational movement relative to said receptacle, so as to minimize stresses exerted on said actuator.

2. The gimbal mounting device of claim 1, further comprising a base securely attached to said at least one pivot bracket.

3. The gimbal mounting device of claim 1, wherein said pivot bracket is capable of adjusting said actuator by at least a 5° rotation.

4. The gimbal mounting device of claim 1, further comprising a pair of pivot bushings substantially surrounding said first pair of gudgeons to facilitate rotation thereabout.

5. The gimbal mounting device of claim 1, further comprising a mounting means within said mounting ring to facilitate the retention of said actuator.

6. The gimbal mounting device of claim 5, wherein said first pair of gudgeons comprises pivot screws that extend through said mounting ring to form said mounting means.

7. The gimbal mounting device of claim 1, wherein said mounting ring further comprises a plurality of arcuate segments, said segments being releasably secured to one another to form said mounting ring.

8. The gimbal mounting device of claim 7, wherein said arcuate segments are releasably secured to one another by a plurality of screws.

9. The gimbal mounting device of claim 1, wherein said actuator is a shower driver.

10. The gimbal mounting device of claim 1, wherein said first pair of gudgeons have a hemispherical head.

11. A method for aligning a shower actuator with a piping apparatus producing a collinear relationship between said actuator and said piping apparatus wherein said shower actuator is free of any translational movement relative to said apparatus, so as to minimize stresses exerted on said actuator, said method comprising the steps of:
    mounting a shower actuator within a gimbaled mounting bracket; and
    angularly aligning said shower actuator with a piping apparatus;
wherein said gimbaled mounting bracket comprises a mounting ring having an inner surface and an outer surface, said mounting ring capable of rotation around a first axis located through a diameter of said mounting ring;

a first pair of gudgeons, mounted on collinear with said first axis on said outer surface of said mounting ring;

an outer pivot ring having an inner surface and an outer surface, said outer pivot ring being concentric to said mounting ring with said inner surface of said outer pivot ring attached to said first pair of gudgeons, said outer pivot ring capable of rotation around a second axis, said second axis being at a right angle to said first axis;

a first pair of trunnions, mounted on collinear with said second axis on said outer surface of said outer pivot ring; and at least one pivot bracket that is rotatably attached to said first pair of trunnions.

12. The method of claim 11, wherein said gimbaled mounting bracket is capable of adjusting said actuator by at least a 5° rotation.

13. The method of claim 11, wherein said gimbaled mounting bracket further comprises a pair of pivot bushings substantially surrounding said first pair of gudgeons to facilitate rotation thereabout.

14. The method of claim 11, wherein said gimbaled mounting bracket further comprises a mounting means within said mounting ring to facilitate the retention of said actuator.

15. The method of claim 14, wherein said first pair of gudgeons comprises pivot screws that extend through said mounting ring to form said mounting means.

16. The method of claim 11, wherein said mounting ring further comprises a plurality of arcuate segments, said segments being releasably secured to one another to form said mounting ring.

17. The method of claim 16, wherein said arcuate segments are releasably secured to one another by a plurality of screws.

* * * * *